United States Patent
Radke, Jr.

(10) Patent No.: US 6,833,396 B2
(45) Date of Patent: Dec. 21, 2004

(54) MOLDING MATERIAL MADE FROM RECYCLED SCRAP TIRES

(76) Inventor: Dan R. Radke, Jr., 2416 Crystal River Ct., Las Vegas, NV (US) 89128

( * ) Notice: Subject to any disclaimer, the term of this patent is extended or adjusted under 35 U.S.C. 154(b) by 431 days.

(21) Appl. No.: 10/014,827

(22) Filed: Oct. 26, 2001

(65) Prior Publication Data

US 2002/0149129 A1 Oct. 17, 2002

Related U.S. Application Data

(63) Continuation-in-part of application No. 08/680,476, filed on Jul. 15, 1996, now Pat. No. 6,374,753.

(51) Int. Cl.$^7$ .......................... B65D 19/26; B29C 43/00
(52) U.S. Cl. ...................... 523/206; 264/122; 523/220; 523/221
(58) Field of Search ................................ 264/122, 912, 264/109, 128, 349, 911; 428/218, 292; 108/51.11, 57.25, 901; 523/200, 221, 205, 206

(56) References Cited

U.S. PATENT DOCUMENTS 4,028,288 A  *  6/1977  Turner .......................... 521/140
5,238,734 A  *  8/1993  Murray .................... 428/295.1

FOREIGN PATENT DOCUMENTS

GB         1586882       *   3/1981

* cited by examiner

Primary Examiner—Mathieu D. Vargot

(57) ABSTRACT

The present invention is a molding material made from a combination of recycled scrap tire particles and recycled plastic flake. In one embodiment, the molding material comprises a plurality of recycled scrap tire particles having different surface areas, a plurality of recycled plastic flake having different surface areas, and a binding agent coated about substantially all of the surfaces of the recycled scrap tire particles and the recycled plastic flakes. The combination of the recycled scrap tire particles having different surface areas, the recycled plastic flake having different surface areas, and the bonding agent results in a molding material that can be used to make a strong, substantially rigid, and durable product.

10 Claims, 4 Drawing Sheets

MOLDING MATERIAL MADE FROM RECYCLED SCRAP TIRES

REFERENCE TO RELATED APPLICATIONS

This application is a continuation-in-part of application Ser. No. 08/680,476 filed on Jul. 15, 1996 now U.S. Pat. No. 6,374,753.

BACKGROUND OF THE INVENTION

The benefits of recycling products made from certain materials is well known. For example, the recycling of plastic products and aluminum cans has become common place. The recycling of these products helps to protect the environment, conserve energy and provide recycled materials to produce new products. In contrast, the recycling of scrap tires is currently in its infancy. Scrap tires are a significant problem in many countries, including the United States which accumulates more than 250 million scrap tires annually. As used throughout this specification the term "scrap tire" is defined as a whole worn out or damaged tire before any processing. In the past, scrap tires were buried in landfills with other waste. Today scrap tires are banned from landfills. In the past several years companies have cut and processed scrap tires into what is referred to as "tire chips." Tire chips are used to create tire derived fuel, (TDF) which can be burned for energy and is being used in cement kilns and other power generation uses. Throughout this specification the term "tire shred" is defined as the first cutting of whole scrap tires into tire shreds which generally are large pieces approximately 2×2 square inches with the steel, wire, nylon, and textile remaining in the tire shreds. Throughout this specification the term "tire chip" is defined as further cutting of the tire shred and for the product TDF, the dimensions are generally 1×1 inch with the steel, wire, nylon, and textile remaining in the tire chip. Like coal, however, TDF is a dirty fuel and has met with resistance from the environmental sector. In recent years recycled scrap tires have also been processed into what is referred to as "crumb rubber." Throughout this specification the term "crumb rubber" is defined as further size reduction of scrap tires into small mesh sizes with the steel, wire, nylon, and textile having been removed. A popular size of crumb rubber is 10/30 mesh which is currently being used as an ingridient in rubberized asphalt road construction. Crumb rubber is also used in the rubber molding industry to manufacture such products as rubber mats, wheel chalks, traffic cone bases, pick-up bed liners, and mud guards.

SUMMARY OF THE PRESENT INVENTION

One object of the present invention was to develop a molding material using recycled scrap tires that can be used to mold a wide variety of commercial products.

The present invention is a commercial product made from whole scrap tires and recycled plastic and a process for manufacturing the same. In one embodiment, the product is that of a commercial pallet used for storing and transporting commodities, goods and items that is made from a combination of recycled scrap tire material, and recycled plastic material. The pallet comprises a plurality of recycled tire particles having different surface areas, a plurality of recycled plastic flakes having different surface areas, and a bonding agent coating all of the surface area of the tire particles and plastic flakes. The combination of recycled tire particles and recycled plastic flakes having different surface areas and the bonding agent makes a strong and durable pallet. The present invention is also a process for manufacturing a pallet from a combination of recycled tire particles and recycled plastic flakes which in one embodiment comprises the steps of: creating a mixture of a plurality of different sized recycled tire particles and a plurality of recycled plastic flakes; adding a bonding agent to the mixture to thereby coat all surfaces of the different sized recycled tire particles and the different sized recycled plastic flake and to provide a molding material; transferring the molding material into molds by weight measurement which correspond to pallet components; applying heat and pressure for a period of time within the mold; and extracting the parts from the mold and press and allowing it to continue to cure for a predetermined length of time prior to the parts being assembled into finished pallets.

BRIEF DESCRIPTION OF THE DRAWINGS

The following detailed description of the invention will be better understood with reference to the accompanying drawings in which.

DETAILED DESCRIPTION OF THE INVENTION

The present invention is a molding material made from whole scrap tires and recycled plastic materials that can be used to manufacture a wide variety of commercial products that have high strength, rigidity, and durability, such as a commercial pallet (not shown). The pallet may be used for storing and transporting commodities, goods and items.

The molding material generally comprises recycled tire particles processed from whole scrap tires. Throughout this specification, the term tire particles is hereby defined as further granulated tire chips to particles having a size in the range from ¾ inch and less, (referred to as ¾ inch minus material) with the removal of the wire and steel. The molding material further comprises recycled plastic flake made from recycled plastic products. The molding material further comprises an epoxy binder mixture to bind the recycled tire particles and recycled plastic flakes. The combination of recycled scrap tire particles having different surface areas and the recycled plastic flakes having different surface areas allow the bonding agent to substantially and effectively coat all of the surface areas of the tire particles and the recycled plastic flake to provide a molding material that can be used to mold a variety of commercial products which have a high mass density and lack of voids and which are strong, rigid, and durable.

Figure 1:
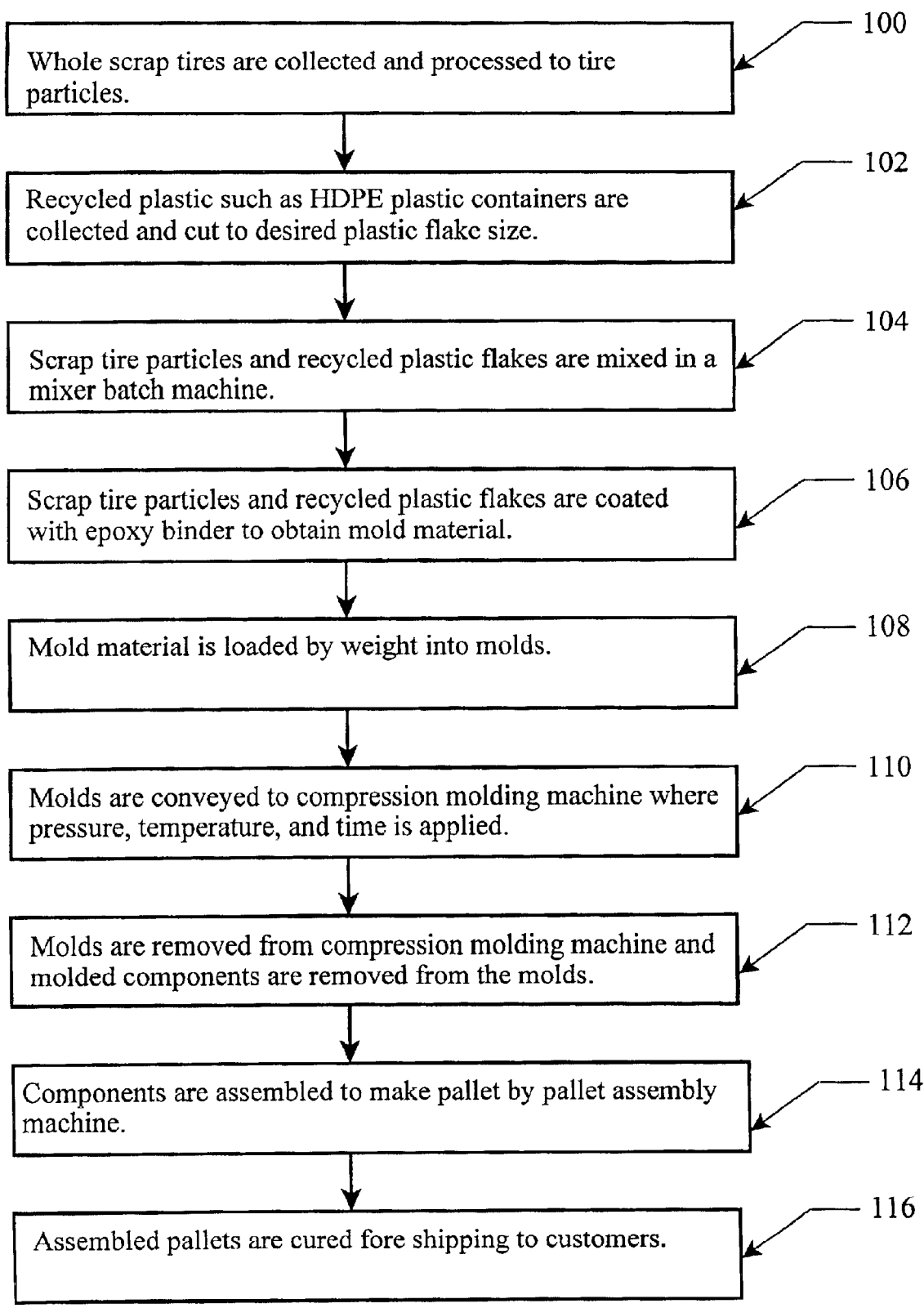
FIG. 1 is a high level flow chart showing a process of manufacturing products in accordance with the present invention.
Figure 2:
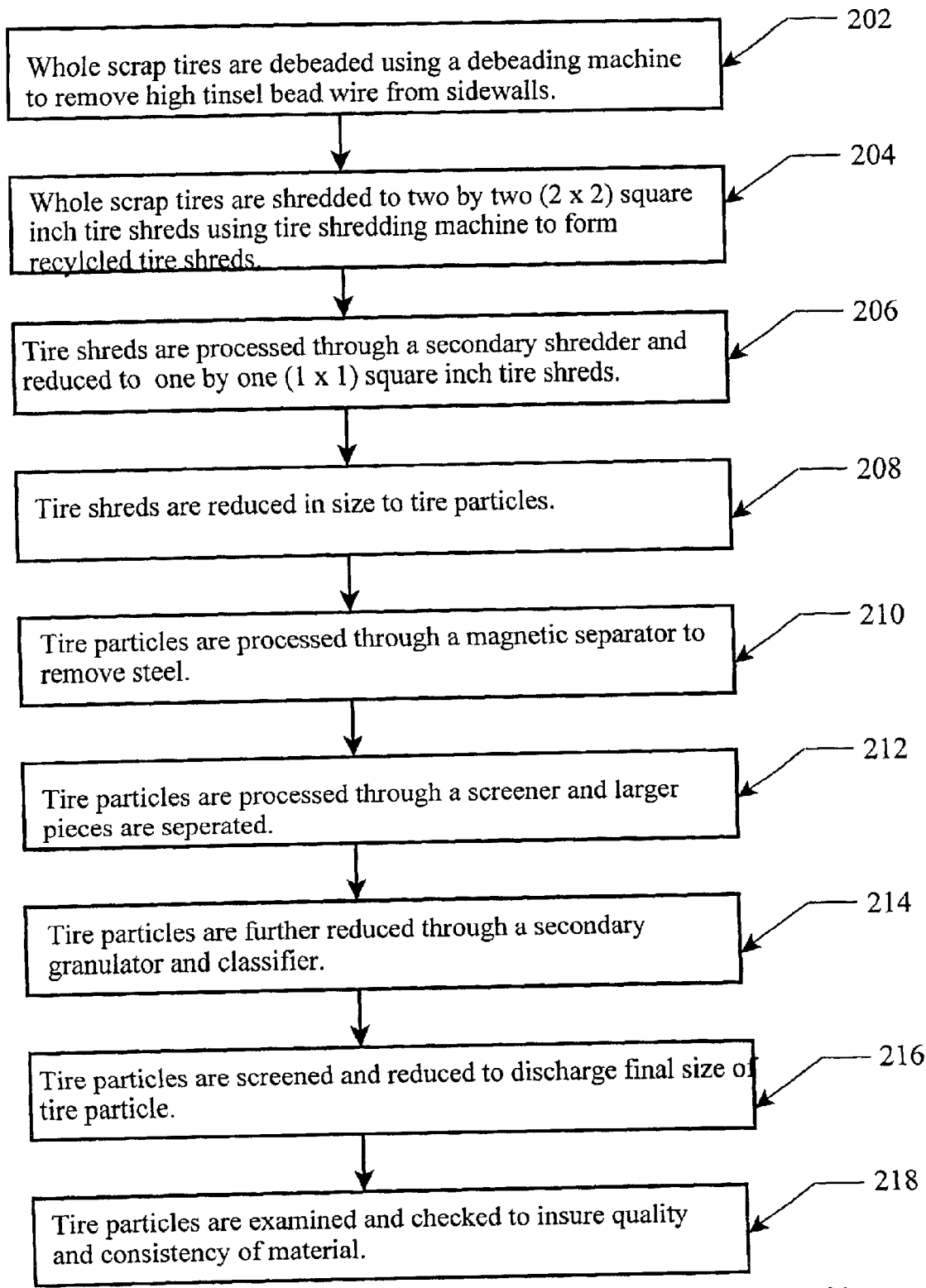
FIG. 2 is a flow chart showing one step of the process of FIG. 1.

FIGS. 1–3 show one embodiment of the process of the present invention for making and preparing the molding material and a commercial product such as a pallet. Referring to FIG. 1, wherein a high level block diagram shows one embodiment of the process of the invention. As shown by block 100, the process generally comprises the first step of collecting whole scrap tires and processing the same into tire particles. As shown by block 102, the next step of the process is to collect recycled plastic products and process the same into plastic flakes of the desired size. As shown by block 104, the next step of the process is to mix the recycled tire particles and the recycled plastic flake in a mixer batch machine. As shown by block 106, the next step of the process is to move or transfer the tire particles and plastic flake into coating drums where the epoxy binder is introduced and allowed to coat all surfaces of the tire particles and plastic flake to thereby produce the molding material. As shown by block 108, the process further comprises the step of depositing the molding material by weight into molds. As shown by block 110, the process further comprises the step of transporting the molds having the molding material therein by conveyor through a pre-heat chamber stage, following which the molds are placed in a hydraulic compression press where the molds are heated and compressed for a period of time. As shown by block 112, the next step of the process is to remove the components from the molds. As shown by block 114, the next step of the process is to assemble the molded components into the product such as a pallet. As shown by block 116, the next step of the process is to allow the assembled products to cure before shipping to customers.

Referring to FIG. 2, wherein a high level block diagram describe step 100 of collecting whole scrap tires and processing the same into tire particles. As shown by block 202, the first step is to de-bead whole tires to remove high tinsel steel bead wire from the side wall of the tire. This step may be accomplished by using tire de-beading machines. As shown by block 204, the next step is to cut the whole scrap tires into tire shreds having dimensions of approximately two by two (2×2) square inches. This step may be accomplished by using tire shredding machinery. As shown by block 206, the next step is to process the tire shreds through a secondary shredder and classifier to reduce the tire shreds to a dimension of one by one square inch. As shown by block 208, the next step is to feed the tire shreds into granulators to further reduce the tire shred to tire particles. As shown by block 210, the next step is to process the tire particles through a magnetic cross belt separator to remove and separate the steel and wire from the rubber. As shown by block 212, the next step is to process the tire particles through a screen to separate the tire particles to the desired size. As shown by block 214, the next step is to process the larger tire particles through a secondary granulator and classifier to produce the final sized particles which are screened once again to create different sizes. The final size of the tire particles is ¾" and minus. As shown by block 216, the next step is to process the tire particles through a series of sifter discharge conveyors to insure the proper mixture of different sized tire particles. As shown by block 218, the final step is to inspect the tire particles to insure the quality and consistency of the tire particles of varied sizes, ¾" and minus. It is critical to the quality of the molding material and the resulting product that the size of the tire particles be in the range of ¾" and minus.

The molding material and the resulting product such as a pallet is made from a combination of a plurality of different sized recycled scrap tire particles and a plurality of different sized recycled plastic flake. Use of different sized tire particles in combination with the use of different sized plastic flake allow an epoxy binder to be added that coats substantially and effectively all of the surfaces of the tire particles and plastic flakes and which results in a molding material that is ready to transfer to molds for production by molding processes such as compression molding. After curing, products formed with the molding material have a high mass density and lack of voids which provides a strong, rigid, and durable pallet. Following are various compositions of the molding material defined in terms of tire particles, plastic flake, and bonding agent, along with molding pressures, temperatures and times:

|  | Relative Weight % | Relative Weight % | Relative Weight % | Relative Weight % |
|---|---|---|---|---|
| Recycled Tire Particle Size |  |  |  |  |
| ¾ inch | 35% | 50% | 50% | 60% |
| ½ inch | 20% | 30% | 30% | 40% |
| ¼ inch | 20% | 10% | 20% | 0% |
| 10/30 Mesh | 10% | 10% | 0% | 0% |
| Tire Buffings (Retreads) | 15% | 0% | 0% | 0% |
| Recycled HDPE Plastic Flake Size |  |  |  |  |
| ¼ inch | 60% | 50% | 70% | 80% |
| ⅛ inch | 40% | 50% | 30% | 20% |

| Tire Particle (Weight %) | HDPE Plastic Flake (Weight %) | Epoxy Binder (Weight %) | Temp. (F.) | Pressure (PSI) | Mold Time (Min) | Cure Time (Hours) |
|---|---|---|---|---|---|---|
| 70% | 12% | 18% | 350 | 120 | 12 | 50–100 |
| 75% | 8% | 17% | 350 | 120 | 12 | 50–100 |
| 75% | 15% | 10% | 400 | 140 | 10 | 50–100 |
| 80% | 8% | 12% | 400 | 140 | 8 | 50–100 |
| 65% | 20% | 15% | 375 | 120 | 10 | 50–100 |

Figure 3A:
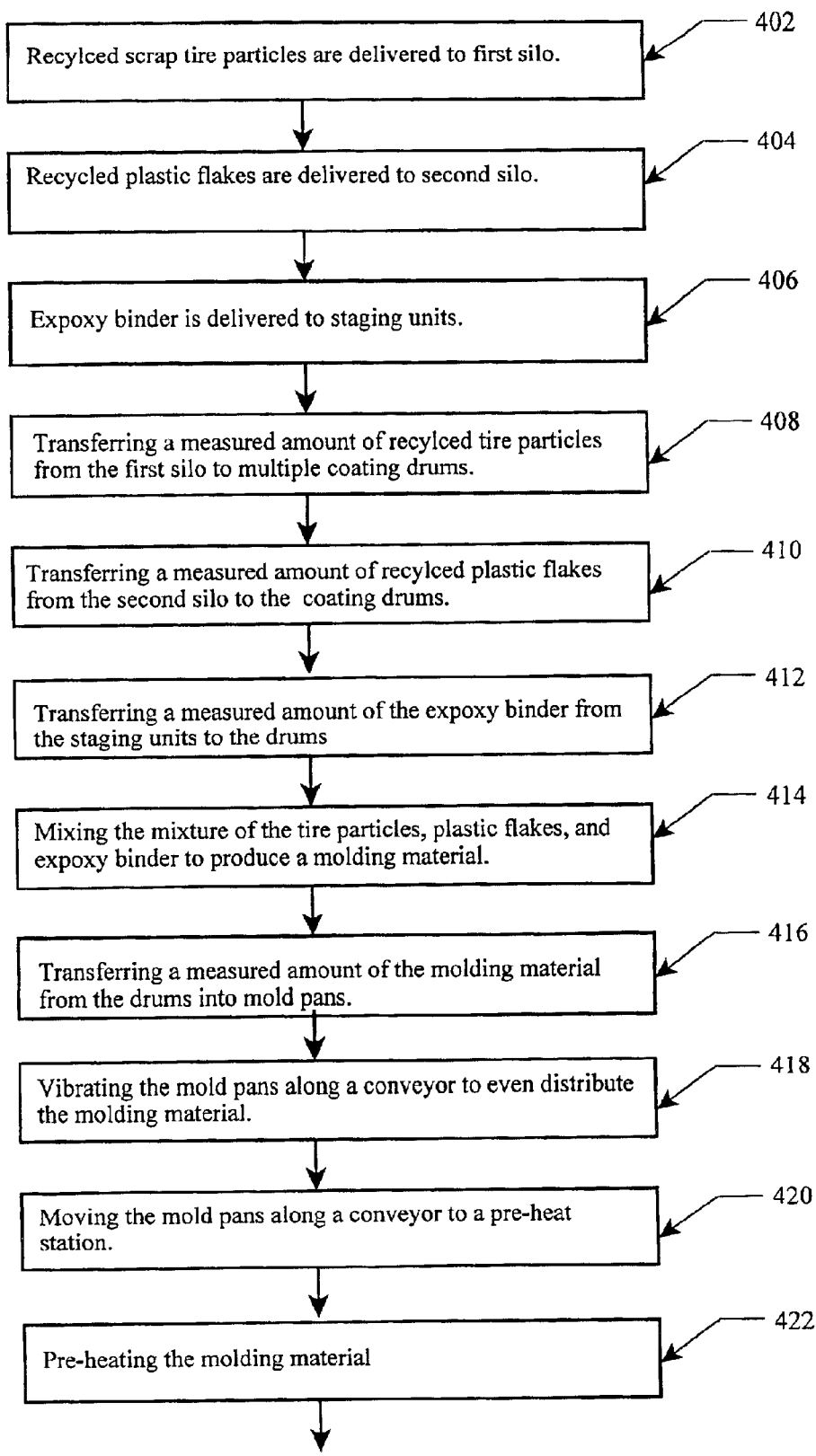
FIGS. 3A and 3B are a high level schematic showing a process for making the molding material of the present invention.
Figure 3B:
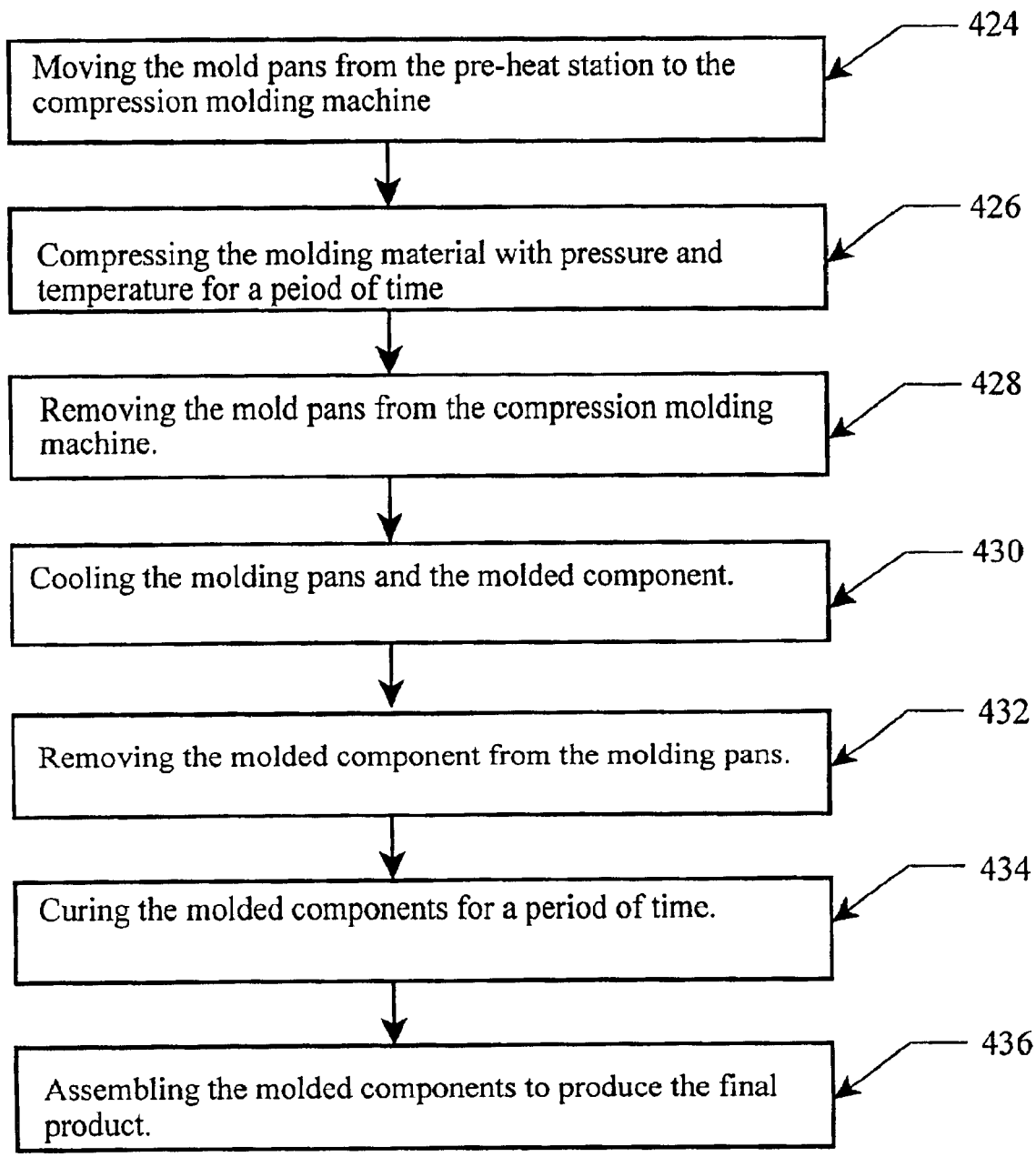

Referring to FIGS. 3A and 3B, wherein another embodiment of the process of making the molding material and products is shown. As shown by block 402, the process generally comprises the step of delivering tire particles to a first silo (not shown). As shown by block 404, the process further comprises the step of delivering plastic flakes to a second silo (not shown). As shown by block 406, the process further comprises the step of delivering an epoxy binder (2 parts) to staging units (not shown). As shown by block 408, the process further comprises the step of delivering a measured amount of tire particles from the first silo to four (4) coating drums. As shown by block 410, the process further comprises the step of delivering a measured amount of plastic flakes from the second silo (not shown) to the four (4) coating drums. As shown by block 412, the process further comprises the step of delivering a measured amount of epoxy binder from the staging units (not shown) first silo to four (4) coating drums. Epoxy binder mixed (2 parts), measure delivered to coating drums (4). As shown by block 414, the process further comprises the step of mixing the combination of the tire particles, plastic flakes and epoxy in the drums to provide a molding material in each drum. As indicated by block 416, the process further comprises the step of transferring a measured amount of molding material into mold pans. As indicated by block 418, the process further comprises the step of vibrating the mold pans on a conveyor to cause the molding material to distribute evenly within the mold pan. The molding material exhibits substantially zero flow characteristics. As indicated by block 420, the process further comprises the step of moving the mold pans on the conveyor to pre-heat stations (not shown). As indicated by block 422, the process further comprises the step of pre-heating the molding material to a temperature of about 375 degrees Fahrenheit. As indicated by block 424, the process further comprises the step of inserting the mold pans into a compression molding press. As indicated by block 426, the process further comprises the step of compressing the molding material while applying heat for a period of time. As indicated by block 428, the process further comprises the step of removing the mold pans from the compression molding presses. As indicated by block 430, the process further comprises the step of moving the mold pans along a conveyor belt to allow cooling. As indicated by block 432, the process further comprises the step of removed the molded component from the mold pans. As indicated by block 434, the process further comprises the step of stacking and curing the molded components prior to assembly. As indicated by block 436, the process further comprises the step of assembling the product from the molded components.

The recycled scrap tire particles are available from any scrap tire processors who have the machinery and equipment to cut the particles to the size required for the manufacture of the material and products, including pallets. Recycled HDPE plastic flake is available from plastic recyclers. The epoxy binder is preferably 100% solids and VOC (volatile organic compound) free and is available from most chemical and epoxy manufacturers. One such epoxy manufacturer is Copps Industries, Inc., 10600 N. Industrial Drive, Mequon, Wis.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. A molding material used to manufacture commercial products, the molding material comprises:
    (a) a plurality of recycled scrap tire particles, substantially free from wire and steel, having a surface area in the range of ¾ inch and less;
    (b) a plurality of recycled plastic flakes having a surface area; and
    (c) a bonding agent that coats substantially all of said surface areas of said tire particles and said plastic flakes,
    wherein combination of said recycled scrap tire particles having different surface areas, said recycled plastic flakes having different surface areas, and said bonding agent results in a molding material that can be used to make a strong, substantially rigid, and durable product.

2. The molding material of claim 1, wherein 50% of said recycled scrap tire particles having about a ¾ inch surface area; 30% of said recycled scrap tire particles having about a ½ inch surface area; 10% of said recycled scrap tire particles having about a ¼ inch surface area; and 10% of said recycled scrap tire particles having about a 10/30 mesh surface area.

3. The molding material of claim 2, wherein 50% of said recycled plastic flakes have a surface area of about a ¼ inch and 50% of said recycled plastic flake have a surface area of about ⅛ inch.

4. The molding material of claim 3, wherein said recycled tire particles are in the range of 65% to 80% of the overall weight of the molding material.

5. The molding material of claim 4, wherein said bonding agent is in the range of 10 to 18 percent of the total weight of the molding material.

6. A process for preparing a molding material comprising the step of:
    (a) providing a plurality of recycled scrap tire particles, substantially free from wire and steel, having a surface area in the range of ¾ inch and less;
    (b) providing a plurality of recycled plastic flakes having a surface area;
    (c) providing a bonding agent that coats substantially all of said surface areas of said tire particles and said plastic flakes; and
    (d) mixing said recycled scrap tire particles with different surface areas, said recycled plastic flakes with different surface areas, and said bonding agent to produce a molding material that can be used to make a strong, substantially rigid, and durable product.

7. The process of claim 6, wherein 50% of said recycled scrap tire particles having about a ¾ inch surface area; 30% of said recycled scrap tire particles having about a ½ inch surface area; 10% of said recycled scrap tire particles having about a ¼ inch surface area; and 10% of said recycled scrap tire particles having about a 10/30 mesh surface area.

8. The process of claim 6, wherein 50% of said recycled plastic flakes have a surface area of about a ¼ inch and 50% of said recycled plastic flake have a surface area of about ⅛ inch.

9. The process of claim 6, wherein said recycled tire particles are in the range of 65% to 80% of the overall weight of the molding material.

10. The process of claim 6, wherein said bonding agent is in the range of 10 to 18 percent of the total weight of the molding material.

* * * * *